(12) United States Patent
Odom et al.

(10) Patent No.: US 11,861,647 B2
(45) Date of Patent: Jan. 2, 2024

(54) SYSTEMS AND METHODS FOR ENHANCED WASTE ITEM ORGANIZATION

(71) Applicants: Cox Enterprises, Inc., Atlanta, GA (US); Cox Communications, Inc., Atlanta, GA (US)

(72) Inventors: Jason Odom, Atlanta, GA (US); Ryan Sean Williams, Atlanta, GA (US); Mike Adams, Atlanta, GA (US); Sudheer Kandimalla, Atlanta, GA (US); Nick Aleksandrowicz, Atlanta, GA (US); Patrice Mantovani, Atlanta, GA (US); Scott Poggi, Atlanta, GA (US)

(73) Assignee: Cox Enterprises, Inc., Atlanta, GA (US)

( * ) Notice: Subject to any disclaimer, the term of this patent is extended or adjusted under 35 U.S.C. 154(b) by 5 days.

(21) Appl. No.: 16/983,926

(22) Filed: Aug. 3, 2020

(65) Prior Publication Data

US 2021/0035146 A1  Feb. 4, 2021

Related U.S. Application Data

(60) Provisional application No. 62/882,280, filed on Aug. 2, 2019.

(51) Int. Cl.
*G06Q 30/02* (2023.01)
*G06Q 30/0226* (2023.01)
(Continued)

(52) U.S. Cl.
CPC ..... *G06Q 30/0226* (2013.01); *G06F 16/5854* (2019.01); *G06F 18/22* (2023.01);
(Continued)

(58) Field of Classification Search
CPC .... G06V 20/20; G06V 10/40; G06F 16/5854; G06K 9/6201; G06Q 10/30; G06Q 30/0226; Y02W 90/00; G07F 7/06
See application file for complete search history.

(56) References Cited

U.S. PATENT DOCUMENTS

| 2005/0065820 A1* | 3/2005 | Mallett | A61B 50/13 |
| | | | 705/2 |
| 2006/0212306 A1* | 9/2006 | Mallett | A61B 50/10 |
| | | | 705/308 |

(Continued)

OTHER PUBLICATIONS

Liu, Yijian, et al., "Novel Smart Waste Sorting System Based on Image Processing Algorithms: SURF-BoW and Multi-class SVM.", 2018, Computer Inf. Sci. 11(3), pp. 35-49. (Year: 2018).*

*Primary Examiner* — John Van Bramer
(74) *Attorney, Agent, or Firm* — Eversheds Sutherland (US) LLP (57) ABSTRACT

Systems and methods are provided herein for enhanced waste item organization. In some embodiments, an example method may include receiving, by a sensor of a device, image data associated with a first waste item. The example method may also include determining, based on the image data associated with the first waste item, a product characteristic of the first waste item. The example method may also include determining, based on the product characteristic of the first waste item, that the first waste item is associated with a first waste receptacle of a plurality of waste receptacles. The example method may also include presenting an indication of the first waste receptacle to the user.

16 Claims, 5 Drawing Sheets

(51) Int. Cl.
  *G06F 16/583* (2019.01)
  *G06V 20/20* (2022.01)
  *G06Q 10/30* (2023.01)
  *G06F 18/22* (2023.01)
  *G06V 10/40* (2022.01)

(52) U.S. Cl.
  CPC ............ *G06Q 10/30* (2013.01); *G06V 20/20* (2022.01); *G06V 10/40* (2022.01)

(56) References Cited

U.S. PATENT DOCUMENTS

2017/0090447 A1* 3/2017 Skocypec ................. B65F 1/06
2017/0300493 A1* 10/2017 Ripley ................ G06F 16/5854
2021/0188541 A1* 6/2021 Kurani .................. B65F 1/1484

* cited by examiner

SYSTEMS AND METHODS FOR ENHANCED WASTE ITEM ORGANIZATION

TECHNICAL FIELD

The present disclosure relates to systems and methods for enhanced waste item organization. The disclosure may more particularly relate to determining appropriate types of waste receptacles in which certain waste items may be deposited.

BACKGROUND

Various types of waste receptacles exist that may be used to organize waste items based on how the items will be processed after being used by a customer. For example, items placed in a trash can may be sent to a landfill, items placed in a recycling bin may be sent to a recycling plant for repurposing, and items placed in a composting bin may be used as compost (for example, for soil). Although the alternatives to landfill waste have numerous benefits, consumers may sometimes be faced with the problem that they are unaware of which receptacle a particular waste item can be placed in. This may lead to the consumer simply placing the items in the landfill receptacle. Even if the consumers choose to place the item in a more environmentally-friendly receptacle, e.g., recycling bin, this actually might be detrimental if the item is non-recyclable or non-compostable. For example, if a consumer places a non-recyclable item in a recycling bin, then an entire batch of otherwise recyclable products may potentially be contaminated.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The disclosure is directed to, among other things, systems and methods for enhanced waste item organization. In some embodiments, the systems and methods described herein may be used to determine one or more types of waste receptacles appropriate for a waste item presented by a user, and may also be used to provide an indication to the user of the one or more types of waste receptacles that should be used.

In some embodiments, the systems and methods described herein may be implemented using a device that may be used to receive information about a waste item associated with a user. The device may be a stationary device, such as an LED screen that is wall-mounted or otherwise affixed to a stationary element, to provide one non-limiting example. Other non-limiting examples may include an optical scanner, a camera, a single-board computer (like a Raspberry Pi) or any other type of device that may be used to receive information about a waste item. A stationary device may be integrated into a waste receptacle or may be located externally to a waste receptacle (for example, mounted above a waste receptacle). The device may also be a mobile device that may or may not be associated with a user (for example, it may be a personal device of a user or may be a mobile device that multiple users may interact with. That is, a device that may be normally a mobile device may be used as a stationary device by mounting it to a particular location), such as a smartphone, tablet, or the like. The device may include any number of types of sensors for receiving information about the waste item from the user, such as a camera or LIDAR sensor, to name a few examples, but may include any other type of sensor that may be capable of capturing information about a waste item. The sensors may be built-in to the device itself or may be external to the device, but in communication with the device, such that data captured by a sensor may be transmitted to and/or from the device.

In some embodiments, the device may receive information about a waste item in any number of ways. For example, using a camera of the device, the device may capture one or more images, a video, or a real-time video feed of a scene that may include the waste item. If the device is a stationary device, such as a wall-mounted device, for example, the device may provide an instruction to a user to hold the waste item within a field of view of the camera of the device so that the device may capture the one or more images, video, and/or real-time video feed of the waste item (for example, as depicted in the use case 200 of FIG. 2). If the device is a mobile device, the device may present instructions to the user to position the camera of the mobile device over the location of the waste item, such that the camera of the mobile device may then be able to capture the one or more images, video, and/or real-time video feed of the waste item (for example, as depicted in the use case 100 of FIG. 1). In some instances, the user may be able to view the real-time video feed of the field of view of the camera of the device. This may allow the user to determine where the waste item is within the field of view of the camera of the device, and may assist the user in more accurately repositioning the waste item and/or the device (if the device is a mobile device and the user is manipulating the position of the mobile device rather than the waste item) such that the device may capture the one or more images, video, and/or real-time video feed of the waste item. The device may also provide more specific instructions to the user. For example, the instructions may include an indication of a particular direction to move or point the device and/or the waste item. As another example, the instructions may indicate that the item should be manipulated so that the device may capture different angles of the item (for example, if the item includes a bar code for the device to scan as described below). The device may also provide feedback to the user in the form of haptic feedback, audio feedback, and/or visual feedback, or any other type of feedback. For example, the device may provide any one or a combination of these types of feedback when the device determines that the waste item is being presented in a particular location (such as the box 105 shown in FIG. 1) in the field of view of the camera of the device that may allow the camera of the device to appropriately capture the one or more images, video, and/or real-time video feed of the waste item. It should be noted that the above descriptions of the waste item being captured by a camera of the device are merely exemplary, and the device may capture information about the waste item using any other type of sensor or combination of types of sensors as well.

In some embodiments, an identifier (such as a computer-readable code, textual information, a logo, or the like) may be included with an element other than the waste item itself. For example, a cafeteria tray may include an identifier including information about some or all of the food items that were originally included on the cafeteria tray (for example, if a cafeteria serves a variety of pre-prepared trays of food). For example, the tray may include an icon indicating that the tray included a soda can, fries, and a hamburger. The sensor of the device may locate the icon and determine that the tray includes a soda can and paper wrappers for the fries and the hamburger. The device may then indicate (as may be described below) which waste receptacles are appropriate for some or all of the items included in the tray. For example, an indication may be provided that the soda can may be recycled and the paper products may be deposited in the trash bin.

In some embodiments, if the device is a mobile device, the mobile device may include an application that a user may use to initiate a waste item determination by the device. A stationary device may also similarly include an application that a user may select (for example, the user may walk up to the stationary device and select an application through a touch screen of the stationary device similar to the manner in which the user may select an application on their mobile device). However, the stationary device may also alternatively be constantly monitoring an environment in which the device is located for waste items being presented by users. For example, in some cases, the device may constantly display an instruction for a user (regardless if a user is actually present or not) to present a waste item until the device determines that a waste item is present in its field of view. In some cases, the device may not constantly display the instructions, but the camera and/or any other sensors of the device may also always be active so that the device may always be monitoring the environment for waste items. In some cases, instead of monitoring the environment for waste items, the device may monitor the environment for one or more users. In these cases, once the device identifies a user in the environment, such as by the detection of motion or movement using one or more motion sensors, it may then proceed to present instructions to the user so that a waste item associated with the user can be captured. In some cases, the device may only provide instructions when it is determined that the user is within a threshold distance of the device to prevent the device from constantly being activated by users in a general proximity of the device that may not have waste items for presentation to the device. In some cases, the device may also not provide instructions to a user unless the device determines that the user is holding a waste item. In some cases, the device may not provide instructions to a user unless the user provides an indication to the device that they wish to interact with the device. For example, the user may walk up to the device and make a particular gesture that is recognized by the device, or the user may physically touch the device (for example, if the device includes a touch screen). The device may make these determinations based on any number of types of sensors, such as a motion sensor, camera, LIDAR sensor, etc. In even further cases, the systems and methods described herein may include a combination of a stationary device and/or a mobile device application of a user. For example, the user may use their mobile device application to provide an indication to a stationary device that the user desires for the stationary device to capture the one or more images, video, and/or real-time video feed of a waste item the user is holding.

In some embodiments, the device may be able to identify that a waste item is included within a field of view of one or more of its sensors using any number of methods. As a first example, the waste item may include a physical code printed on it, such as a bar code, quick response (QR) code, or any other type of computer-readable code or marker. Additionally, the waste item may include an identifier other than a computer-readable code, such as an a waste receptacle logo (for example, recycling logo), a food item type logo, waste item logo, textual information, or the like. For example, the waste item may have its name printed in text on a portion of the waste item. The device may capture information through its sensors until it determines that one of these types of computer readable codes (or other types of identifiers) is identified in any one of one or more images, video, and/or a real-time video feed being captured by the device. In such instances, the device may be able to decipher the code to determine the type of waste item. As a second example, the device may use computer vision methods to identify that a waste item is presented within a field of view of a sensor. For example, based on one or more images, video, and/or a real-time video feed of a field of view of a sensor of the device, a computer vision algorithm may be able to perform object classification of objects identified within the one or more images, video, and/or a real-time video feed. Through this object classification, the computer vision algorithm may be able to identify that an object is a waste item. This object classification may be capable of being performed even if the user is not actively presenting the waste item to the sensor of the device (for example, the device may be monitoring the environment in real-time). In some cases, the device may simply request that the user present the waste item within a predetermined space within the field of view of the sensor of the device that is capturing the one or more images, video, and/or a real-time video feed (for example, as depicted in scene 102 of FIG. 1).

In some embodiments, the device may also allow the user to manually input the type of waste item, instead of using the above methods to identify the waste item. For example, the user may be able to provide a name of the waste item as an input to the device using a keyboard of the device or by audibly stating the name of the waste item into a microphone of the device. As another example, the user may be able to select a specific waste item from a listing of waste items that may be presented to the use through a display of the device. The listing may be in the form of a list of the names of certain waste items, a gallery of images of waste items, or any other form of listing. In some instances, the listing that is provided to the user may depend on a location of the user. That is, particular locations may be associated with a fixed selection of items (for example, a cafeteria may serve a predetermined list of food items and/or may use a predetermined set of storage containers, utensils, or other types of waste items). If the device is a stationary device, it may be stationary within the same location, so the listing of waste items may also remain the same over time. In some cases, however, the listing of devices may change even if the device remains in the same location. For example, a certain location may not have a fixed assortment of available waste items, or the location may periodically change its assortment of available waste items. In these cases, the listing of waste items may be automatically or manually updated at the device as the items that are made available at the location of the device are changed. If the device is a mobile device, the relevant listing of items may depend on the current location of the mobile device. For example, if the user associated with the mobile device is in a school cafeteria at a first time, and then at an airport at a second time, the listing of items available at the two locations may be different. Thus, in order to determine which listing of waste items may need to be presented to the user, the mobile device may determine its geolocation (for example, through any number of methods, such as global positioning system (GPS) signals to and/or from the mobile device). Once the mobile device has determined its location, it may determine the listing of waste items to present to the user. For example, the mobile device may send a request to an external source (such as an external server hosting a database) for the external source to provide the listing of waste items based on the location. In some cases, however, the mobile device may have the lists of waste items for each location stored locally and may not need to rely on an external data source.

In some instances, the listing provided to the user (for example, both through stationary and mobile devices) made be location-independent and may include a listing of any number of waste items, even waste items that may not necessarily be currently available at that particular location. For stationary devices this may be beneficial because a user may transport a waste item from one location to another (for example, the user may place a candy wrapper in their pocket, walk to a new location, and then decide to throw the candy wrapper away at the second location), so even if a location is associated with a fixed assortment of waste items, items not included in that fixed assortment may still potentially be presented to the device.

In some embodiments, once the one or more images, video, and/or real-time video feed of the waste item is captured, it may be determined what type of waste item is being presented by the user (if the user manually selects the specific waste item from a list, then these determinations may not need to be made). This determination may be made by comparing the one or more images, video, and/or real-time video feed of the waste item to one or more previously-stored images, videos, and/or real-time video feeds of waste items (for example, a compilation of images stored in a database). In some instances, artificial intelligence (for example, machine learning, deep learning, fuzzy logic, etc.) may be used to determine the type of waste item based on this comparison. For example, the artificial intelligence algorithm may be trained with one or more previously-captured images, videos, and/or real-time video feeds of waste items in order to train the artificial intelligence algorithm. Additionally, every time a new waste item is presented by a user, the one or more images, video, and/or real-time video feed of the waste item, along with the determined of the type of waste item that is made, may be stored along with the previously-stored images, videos, and/or real-time video feeds. Thus, every time a user presents a waste item to the device, the artificial intelligence algorithm may improve. Additionally, the device may confirm with the user that the determined type of waste item is the correct type of waste item. For example, the device may present to the user an indication of the determined type of waste item, and the user may indicate either that the determined type of waste item matches the actual waste item or that the determined type of waste item does not match the actual waste item. If the user indicates that the determined type of waste item is not the actual waste item, the type of waste item may be removed from a realm of options and the process may iterate until a correct type of waste item is determined.

In some embodiments, the determination of the one or more waste receptacles that the waste item may be deposited in may be performed by the device itself. In some embodiments, the device may simply serve as a means for capturing information about the waste item, and the determination may be made by an external system, such as a cloud platform. In some embodiments, the device and external system may share in the processing required to determine the appropriate waste receptacle. In even further embodiments, the device may be incorporated into the waste receptacles themselves. In such embodiments, each individual waste receptacle may have a device, one of the waste receptacles may have the device, or all waste receptacles may collectively share a device.

In some embodiments, the determination as to the one or more waste receptacles the waste item may be deposited into may be based on one or more rules. The one or more rules may be located-dependent. The rules may be used to determine certain protocols for depositing waste items in particular waste receptacles associated with the location. In some instances, the location may indicate that the waste receptacles are located within a given country, state, region, municipality, etc., which may have their own established protocols that define what items are allowed to be placed in certain waste receptacles. For example, municipality A may have a rule that only plastics may be recycled, but municipality B may allow plastics and glass bottles. In some instances, the geolocation may be used for even more narrow applications, such as determining that the waste receptacles are located in a particular commercial establishment or residential home. For example, a particular place of business might have its own separate protocols for depositing items in waste receptacles. In some cases, the rules may also include rules that may have been previously established by the user. For example, the user may manually indicate the types of waste receptacles that are available to them in certain locations (for example, at their place of residence), and this information may be used in determining which one or more waste receptacles the waste item presented by the user may be deposited in. For example, a user's place of work may include a recycling bin, a compost bin, and a general trash bin, but the user's home may only include a recycling bin and a trash bin. In cases where the compost bin may be presented as the type of waste receptacle where an example waste item may be deposited at the user's place of work, a different type of waste receptacle (for example, either the recycling bin or the trash bin) may be presented as the type of waste receptacle where an example waste item may be deposited at the user's home.

In some embodiments, the rules may either be stored locally at the device or may be stored externally to the device and requested by the device before making a waste receptacle recommendation to the user. In some embodiments, if the device is stationary, then the rules associated with the device may remain consistent because the location of the device may remain consistent. However, if the device is a mobile device, the rules for determining which one or more waste receptacles may be appropriate for a given waste item may change depending on the location of the user and the mobile device. Given this, determination of which waste receptacle is appropriate for the waste item may be made based on the geolocation of the mobile device. The geolocation may refer to the geographical location of the waste receptacles and may be determined through such means as Global Position System (GPS) coordinates, or any other means for determining location of an object. That is, similar to the manner in which it is determined which list of waste items is associated with a location, the particular rules associated with a location may be requested from an external source (such as an external server hosting a database), or may be stored locally at a device.

In some embodiments, the one or more types of waste receptacles in which the waste item may be deposited may also be based on a current state of the waste item. That is, the determination may not only be based on the type of waste item, but also may be based on its state. The state of the waste item may include factors such as how clean or dirty the waste item is. For example, if the waste item is a pizza box, it may include scraps of food and food stains, or it may be completely clean. In the first scenario, the appropriate waste receptacle may be a general trash bin because the dirty box may not be able to be processed by a recycling plant. However, in the second case, the appropriate waste receptacle may be the recycling bin. The state of the waste item may also include a level of deformation or damage to the waste item. For example, a broken glass bottle may only be appropriate for the general trash bin, but a full intact glass bottle may be recycled. These are just a few examples of a state of a waste item, and may include any other number of factors that may be determinative as to whether the waste item can be recycled, composted, etc. The status of the waste item, in some instances, may be determined based on some of the same or similar methods used to determine the type of waste item (for example, computer vision, manual indication by the user, etc.). In some instances, the location-based rules may also be relevant to the status of the item. For example, Municipality A may have a rule that a slightly torn box can be recycled, but Municipality B may have a rule that any damage to a box means it can no longer be recycled.

In some embodiments, once the type of waste item is determined, an indication may be presented to the user of one or more types of waste receptacles in which the waste item presented by the user may be deposited. A type of waste receptacle may refer to a type of waste item that may be deposited in that waste receptacle. For example, a type may include recycling, compost, trash, or the like. In some instances, the indication may be provided through a display of the device. In some instances, for example, if the device is a stationary device, the one or more waste receptacles may actually be located proximate to the device. In such instances, an indication to the user may be provided through one or more of the waste receptacles themselves. For example, an LED light on the one or more waste receptacles may turn on to indicate that the waste item may be deposited in any of those waste receptacles (this is merely one example of a potential indication that a waste receptacle may provide, and should not be taken to be limiting. For example, the waste receptacles may themselves include one or more displays that may present information indicating to the user that they should either be used or not be used to deposit the waste item). In some cases, the waste receptacles themselves may provide the indication even if the device if a mobile device. For example, the mobile device may be able to determine that one or more waste receptacles are proximate to the mobile device, and the mobile device may provide an indication to the one or more waste receptacles to then provide an indication to the user which of the waste receptacles may be used. In some cases, both a stationary device and a mobile device may be used, and the mobile device may provide an indication to the stationary device to provide an indication to the user which waste receptacle(s) may be used. For example, this may be the case when the mobile device is used to capture the one or more images, video, and/or real-time video feed of the waste item, but the waste receptacles are also proximate to a display screen that may be in communication with the mobile device. The mobile device may send an indication to the display screen proximate to the waste receptacles to provide an indication as to which waste receptacle may be used.

In some embodiments, the indication of the one or more waste receptacles in which the waste item may be deposited may be provided in any number of forms. As a first example, the indication may be in the form of a textual instruction including the name of the type of one or more waste receptacles. As a second example, the indication may be in the form of an image of the types of one or more waste receptacles. As a third example, the indication may be in the form of a logo that is typically associated with the type of waste receptacle (for example, the Mobius loop recycling logo). Additionally, in some scenarios, the one or more waste receptacles may not be located proximate to the device providing the indication to the user. In these scenarios, the device may also indicate to the user one or more locations where they may find the appropriate one or more waste receptacles. For example, the device may provide a name of a location to the user, may provide a map (for example, a layout of a building, a map of a city, or any other type of map) with an indication on the map of where the user can find the waste receptacle, or may provide such an indication in any number of other ways. Furthermore, while various types of indications are described above, any number of these indications may be presented in combination with one another to the user. For example, the word "recycling bin" may be presented along with a picture of a recycling bin.

It should be noted that although reference may be made herein to food-related waste items, the systems and methods described herein may be applicable in any other contexts as well. For example, a user may scan a used toy product using the sensor of the device. Although such products may not necessarily be deposited in the same waste receptacles where food items may be deposited, the systems and methods described herein may be able to identify a location where the product may be deposited. For example, it may be determined that a local mall has a toy drive and that the used toy may be taken to the location of the mall and deposited for use in the toy drive. The same may apply for products such as used sporting goods. The system may be able to identify a used sporting goods store in the area that the user may be able to take the used sporting goods to. The same may also apply for any other type of item. That is, the systems and methods may be used more generally for identifying types of items and providing an indication to a user as to where they can take the item if they wish to dispose of it, sell it, donate it, etc. A location or location(s) where the user may take the item may be provided to the user as well.

In some embodiments, once a determination of which one or more waste receptacles are appropriate for depositing a waste item is made, one or more actions may then be triggered. One example of an action may include a physical unlocking of the one or more waste receptacles in which the item may be deposited. That is, the waste receptacles may be locked or otherwise inaccessible before a determination is made as to which waste receptacle is appropriate for the waste item. This may ensure that waste items are deposited in the correct receptacles to prevent contamination of a receptacle by an item that does not belong. For example, the device may determine that a user has presented a recyclable item, so the recycling receptacle may be opened and/or unlocked, while the other waste receptacle types may remain locked and inaccessible to the user. In some embodiments, some or all of the waste receptacles may be in an unlocked state before the determination is made by the device (that is, unlocked by default), and, once the determination is made, all but the waste receptacles that the waste item may be deposited in may then be locked. In some embodiments, however, no action may be taken based on the determination of the appropriate waste receptacle(s). That is, only an indication may be provided as to which receptacles may be used, but the user may ultimately choose to deposit the waste item in a different waste receptacle.

In some embodiments, incentives may be provided to users for depositing waste items in the correct waste receptacle. The incentives may be in the form of points, cash, or other elements that may be used to track the number of times a user has correctly deposited an item in the waste receptacle indicated by the device. The incentives may be redeemable for rewards (e.g., if the waste receptacles are associated with a cafeteria at a work environment, the rewards may include free meals at the cafeteria).

In some embodiments, the manner in which it may be determined that the user has correctly deposited the waste item may be performed in a number of ways. As a first example, the sensors of the device and/or any sensors of the waste receptacles may be used to visually identify that the user has deposited the waste item in the correct waste receptacle. For example, if the device is a stationary device that is located above the waste receptacles, the camera of the device may be able to capture one or more images, a video, and/or a real-time video feed of the user physically placing the waste item in the correct waste receptacle. As another example, some or all of the individual waste receptacles may have their own sensors, such as weight sensors, proximity sensors, visual sensors, etc., that may be able to determine that a waste item has been added to the correct waste receptacle.

In some embodiments, advertisements may be provided to the users through the scanning device (e.g., wall-mounted device and/or user mobile device). The advertisements may be based off of a waste item being presented by a user. For example, if the user is scanning a particular brand of soda bottle to deposit in a waste receptacle, then the scanning device may provide an advertisement for that same brand of soda bottle, a different product made by the same brand, or a similar product made by a different brand. The advertisements may also be based on a user waste depositing history (e.g., based on waste items the user has deposited in waste receptacles in the past).

In some embodiments, a user may have more than one waste item they wish to deposit in one or more waste receptacles. The items may be of the same of different product types and may be appropriate for placement in a single type of waste receptacle or multiple different types of receptacles. In such cases, the device may perform individual determinations for each of the items, or may alternatively perform a simultaneous determination for all of the waste items and use computer vision to separate out the individual items. In some embodiments, the user may also manually input each individual waste item type as described herein.

Illustrative Use Cases

Figure 1:
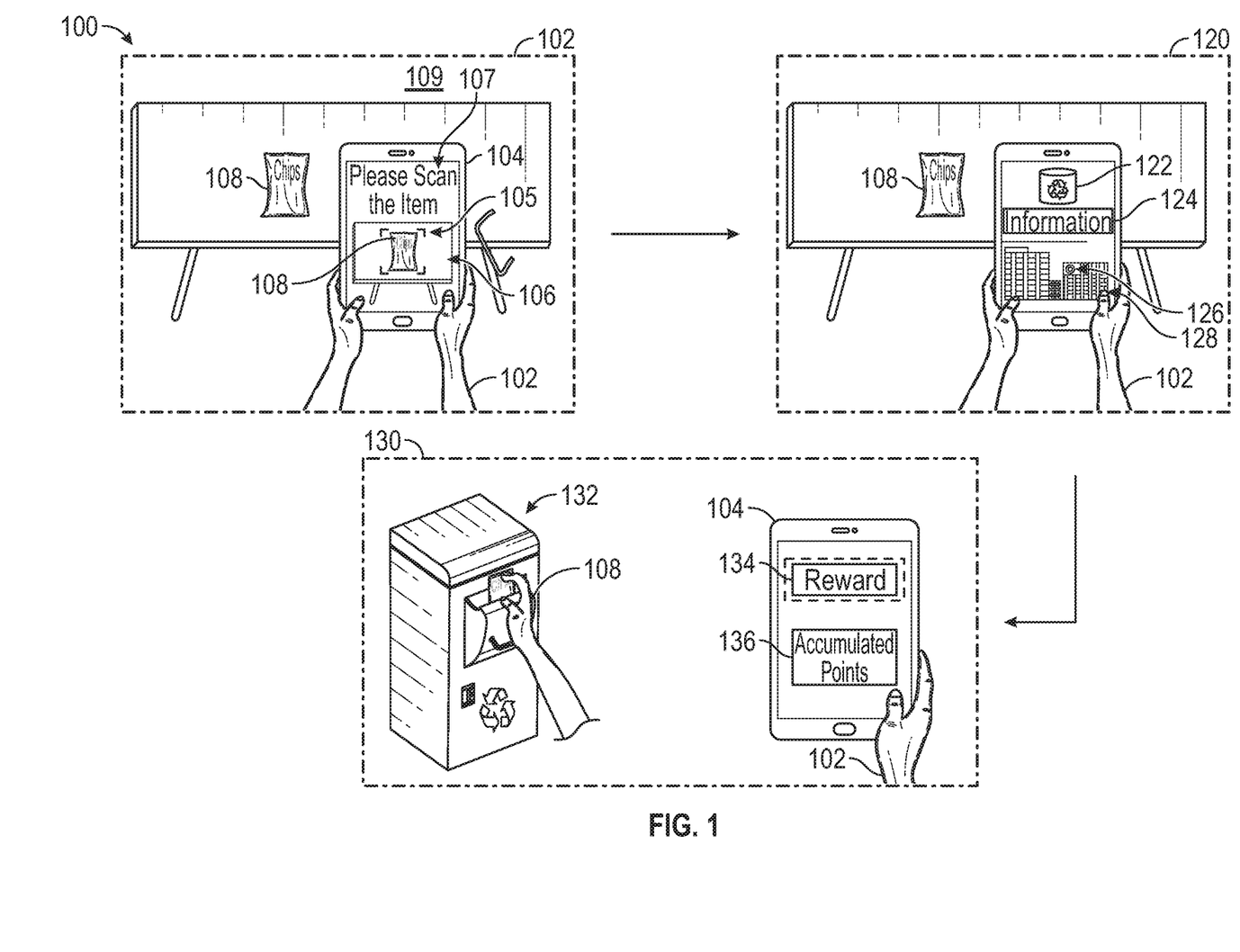
FIG. 1 depicts an illustrative use case, in accordance with one or more example embodiments of the disclosure.

Turning now to the drawings, FIG. 1 depicts an illustrative use case 100, in accordance with one or more example embodiments of the disclosure. The use case 100 may exemplify the use of a mobile device 104 to perform the waste receptacle determinations described herein. More specifically, the use case 100 may depict how the process of determining an appropriate waste receptacle using the systems and methods described herein may be perceived by a user 102. The use case 100 may begin with scene 110. Scene 110 may depict a mobile device 104 associated with a user 102, where the mobile device 104 may include a display 105. The mobile device 104 and the user 102 may be located in an environment 109 that may also include a table 103 and a waste item 108 (depicted as a bag of chips). The scene 110 may involve the user initiating an application of the mobile device 104 that the user 102 may use to identify an appropriate waste receptacle in which to deposit the waste item 108. Upon initiation of the application, the application may provide one or more instructions 107 to the user 102. The instructions 107 may indicate, for example, that the user 102 should scan the waste item 108. Scanning the waste item 108 may be performed using a sensor (not shown in the figure) of the mobile device 104, such as a camera or any other type of sensor and/or combination of types of sensors. In the scene 110, the application may also include a scanning region 106. The instructions 107 may indicate to the user 102 that they should position the mobile device 104 such that the camera (or other sensors) of the mobile device 104 captures an image, video, or real-time video feed of the waste item 108 within the scanning region 106, as shown in the figure. For example, the application may present a real-time video feed being captured by the camera, and the user may move the mobile device 104 until the waste item 108 is presented within the scanning region 106. Once the waste item 108 is within the scanning region 106, one or more images, a video, or a real-time video feed of the waste item 108 may be captured for subsequent processing. The one or more images, video, or real-time video feed of the waste item 108 may be captured automatically by the mobile device 104 based on a determination that the waste item 108 is within the scanning region 106. The one or more images, video, or real-time video feed of the waste item 108 may also be captured based on a manual input by the user 102. For example, the user may press a button on the mobile device 104 to indicate that the one or more images, video, or real-time video feed of the waste item 108 should be captured by the mobile device 104. It should also be noted that although the scene 110 shows the application as including the scanning region 106, the application may similarly not include any scanning region 106, and the waste item 108 may only need to be within any portion of a field of view of the camera of the mobile device 108.

Continuing with FIG. 1, the use case 100 may proceed to scene 120. Scene 120 may depict a user interface of the application after a determination as to the appropriate waste receptacle(s) for the waste item 108 has been made. In some embodiments, the application at this time may present an indication of one or more types of waste receptacles in which the waste item 108 may be deposited. For example, the indication may include an image 122 of the one or more types of waste receptacles. In this case, the appropriate waste receptacle may be determined to be a recycling bin. The indication may also include textual information 124 about the appropriate waste receptacle. For example, the textual information 124 in this case may include the name "recycling bin." In some cases, the textual information 124 may include information other than the name of the type of waste receptacle. As a first example, the textual information 124 may also include a location 126 of the waste receptacle as may be shown in a map 128 on the user interface. As a second example, the textual information 124 may also include a number of reward points associated with the waste item 108. As a third example, the textual information 124 may also include an instruction to the user 102. For example, the instruction may indicate that the user 102 may need to clean the waste item 108 before it may be deposited in a particular waste receptacle.

Continuing with FIG. 1, the use case 100 may proceed to scene 130. Scene 130 may depict the user 102 depositing the waste item 108 into the appropriate waste receptacle 132 (in this case a recycling bin). Scene 130 may also depict the application of the mobile device 104 presenting a reward 134 for the user 102 for depositing the waste item 108 in the appropriate waste receptacle 132. The application may also be depicted as presenting a total accumulated points 136 the user 132 has earned for depositing waste items into appropriate waste receptacles over time. In some embodiments, the manner in which it may be determined that the user 102 has correctly deposited the waste item 108 into the waste receptacle 132 may be performed in a number of ways. As a first example, any sensors of the mobile device 104 and/or any sensors of the waste receptacle 132 may be used to visually identify that the user 102 has deposited the waste item 108 in the correct waste receptacle 132. For example, the camera of the mobile device 104 may be able to capture one or more images, a video, and/or a real-time video feed of the user physically placing the waste item in the correct waste receptacle. As another example, some or all of the individual waste receptacles may have their own sensors, such as weight sensors, proximity sensors, visual sensors, etc., that may be able to determine that a waste item 108 has been added to the correct waste receptacle 132.

Figure 2:
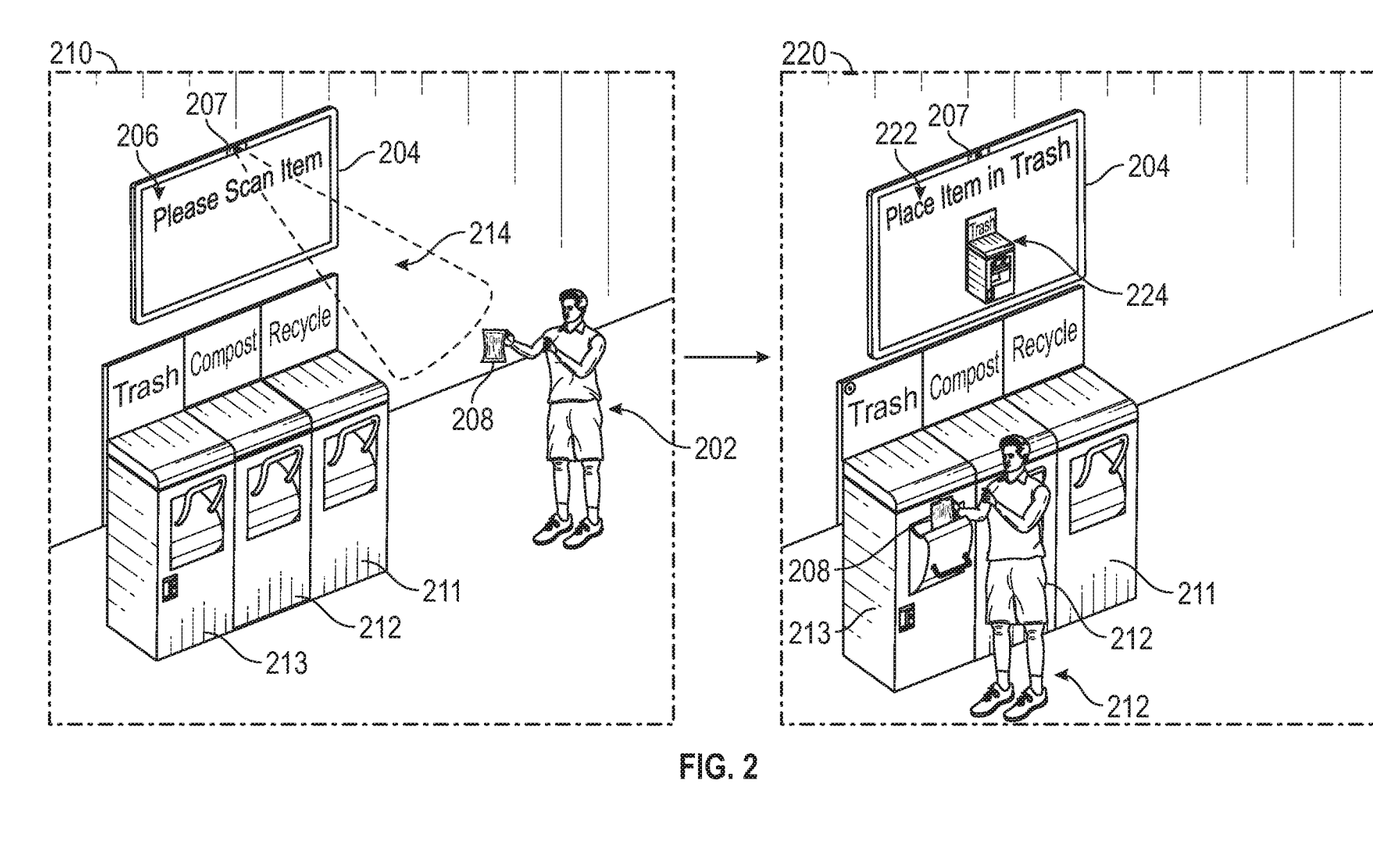
FIG. 2 depicts an illustrative use case, in accordance with one or more example embodiments of the disclosure.

FIG. 2 depicts an illustrative use case 200, in accordance with one or more example embodiments of the disclosure. The use case 200 may exemplify the use of a stationary device 204 to perform the waste receptacle determinations described herein. The use case 200 may begin with scene 210. Scene 210 may depict a stationary device 204 that may be mounted to a wall above one or more waste receptacles (for example, a trash bin 213, a compost bin 212, and a recycling bin 211), where the stationary device 204 may include a display 205 and one or more sensors (which may be depicted in the figure as a camera 207). The camera 207 may also have an associated field of view 214. A user 202 may be located nearby the stationary device 204 and may be holding a waste item 208 (which may be depicted as a bag of chips). The scene 210 may involve the user 202 approaching the stationary device 204 so that the stationary device 204 may provide an indication to the user 202 of which of the waste receptacles are appropriate for the waste item 208.

Continuing with FIG. 2, The scene 210 may begin with the stationary device 204 providing an instruction 206 to the user. The instruction 206 may provide an indication to the user 202 to place the waste item 208 within a field of view 214 of the camera 207 of the stationary device 204. As described above, the user 202 may walk up to the stationary device 204 and select an application through a touch screen of the stationary device 204 similar to the manner in which the user may select an application on their mobile device. However, the stationary device 204 may also alternatively be constantly monitoring an environment in which the stationary device 204 is located for waste items being presented by users. For example, in some cases, the stationary device 204 may constantly display an instruction for a user (regardless if a user is actually present or not) to present a waste item until the stationary device 204 determines that a waste item 208 is present in its field of view 214. In some cases, the stationary device 204 may not constantly display the instructions, but the camera 207 and/or any other sensors of the stationary device 204 may also always be active so that the stationary device 204 may always be monitoring the environment for waste items. In some cases, instead of monitoring the environment for waste items, the stationary device 204 may monitor the environment for one or more users. In these cases, once the stationary device 204 identifies a user 202 in the environment, it may then proceed to present instructions to the user 202 so that a waste item 208 associated with the user 202 can be captured. In some cases, the stationary device 204 may only provide instructions when it is determined that the user 202 is within a threshold distance of the device to prevent the stationary device 204 from constantly being activated by users in a general proximity of the stationary device 204 that may not have waste items for presentation to the stationary device 204. In some cases, the stationary device 204 may also not provide instructions to a user 202 unless the device determines that the user 202 is holding a waste item 208. In some cases, the stationary device 204 may not provide instructions to a user 202 unless the user 202 provides an indication to the stationary device 204 that they wish to interact with the stationary device 204. For example, the user 202 may walk up to the stationary device 204 and make a particular gesture that is recognized by the stationary device 204, or the user may physically touch the stationary device 204 (for example, if the stationary device 204 includes a touch screen). The stationary device 204 may make these determinations based on any number of types of sensors, such as a motion sensor, camera, LIDAR sensor, etc.

Continuing with FIG. 2, the use case 200 may proceed with scene 220. Scene 220 may depict a display of the stationary device 204 after a determination as to the appropriate waste receptacle(s) for the waste item 208 has been made. In some embodiments, the display at this time may present an indication of one or more types of waste receptacles in which the waste item 208 may be deposited. For example, the indication may include an image 224 of the one or more types of waste receptacles. In this case, the appropriate waste receptacle may be determined to be a trash bin. The indication may also include textual information 222 about the appropriate waste receptacle. For example, the textual information 222 in this case may include the text "Place item in trash." In some cases, the textual information 222 may include information other than the name of the type of waste receptacle. As a first example, the textual information 222 may also include a location of the waste receptacle as may be shown in a map on the display (not shown in the figure). In the scene 220, the waste receptacles are located right underneath the stationary device 204, so the map may not be necessary and/or presented in this case, but may be presented if the waste receptacles were not located nearby the stationary device 204. As a second example, the textual information 222 may also include a number of reward points associated with the waste item 208. As a third example, the textual information 222 may also include further instructions to the user 222. For example, the instructions may indicate that the user 202 may need to clean the waste item 208 before it may be deposited in a particular waste receptacle.

In some embodiments, scene 220 may also depict an example of an action that may be triggered based on a determination of an appropriate waste receptacle type for the waste item 208 being made. For example, as depicted in the figure, the action may include unlocking a door of the appropriate waste receptacle (in this case, the trash bin 213). That is, the waste receptacles may normally be locked and inaccessible to the user 202, and may only be unlocked and accessible to the user 202 once it is determined that the particular waste receptacle is appropriate for the type of waste item 208. This may ensure that waste items are deposited in the correct receptacles to prevent contamination of a receptacle by an item that does not belong. However, as described above, some or all of the waste receptacles may be in an unlocked state before the determination is made by the stationary device 201 (that is, unlocked by default), and, once the determination is made, all but the waste receptacles that the waste item may be deposited in (for example, the trash bin 213) may then be locked. In some embodiments, however, no action may be taken based on the determination of the appropriate waste receptacle(s). That is, only an indication may be provided as to which receptacles may be used, but the user 202 may ultimately choose to deposit the waste item in a different waste receptacle.

Illustrative Methods

Figure 3:
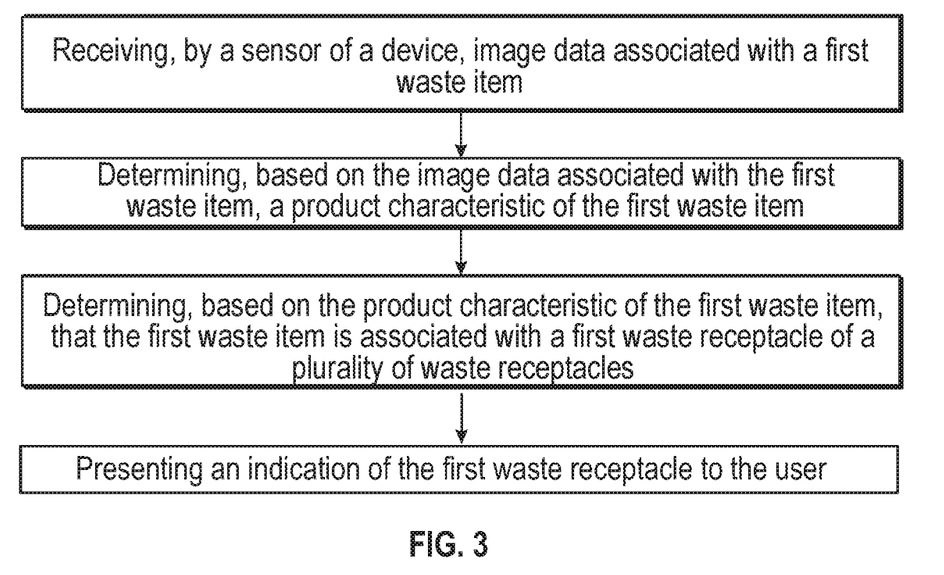
FIG. 3 depicts an example method, in accordance with one or more example embodiments of the disclosure.

FIG. 3 is an example method 300 in accordance with one or more example embodiments of the disclosure. At block 302 of the method 300 in FIG. 3, the method may include receiving, by a sensor of a device, image data associated with a first waste item.

Block 304 of the method 300 may include determining, based on the image data associated with the first waste item, a product characteristic of the first waste item.

Block 306 of the method 300 may include determining, based on the product characteristic of the first waste item, that the first waste item is associated with a first waste receptacle of a plurality of waste receptacles. In some embodiments, the determination of the one or more waste receptacles that the waste item may be deposited in may be performed by the device itself. In some embodiments, the device may simply serve as a means for capturing information about the waste item, and the determination may be made by an external system, such as a cloud platform. In some embodiments, the device and external system may share in the processing required to determine the appropriate waste receptacle. In even further embodiments, the device may be incorporated into the waste receptacles themselves. In such embodiments, each individual waste receptacle may have a device, one of the waste receptacles may have the device, or all waste receptacles may collectively share a device.

In some embodiments, the determination as to the one or more waste receptacles the waste item may be deposited into may be based on one or more rules. The one or more rules may be located-dependent. The rules may be used to determine certain protocols for depositing waste items in particular waste receptacles associated with the location. In some instances, the location may indicate that the waste receptacles are located within a given country, state, region, municipality, etc., which may have their own established protocols that define what items are allowed to be placed in certain waste receptacles. For example, municipality A may have a rule that only plastics may be recycled, but municipality B may allow plastics and glass bottles. In some instances, the geolocation may be used for even more narrow applications, such as determining that the waste receptacles are located in a particular commercial establishment or residential home. For example, a particular place of business might have its own separate protocols for depositing items in waste receptacles. In some cases, the rules may also include rules that may have been previously established by the user. For example, the user may manually indicate the types of waste receptacles that are available to them in certain locations (for example, at their place of residence), and this information may be used in determining which one or more waste receptacles the waste item presented by the user may be deposited in. For example, a user's place of work may include a recycling bin, a compost bin, and a general trash bin, but the user's home may only include a recycling bin and a trash bin. In cases where the compost bin may be presented as the type of waste receptacle where an example waste item may be deposited at the user's place of work, a different type of waste receptacle (for example, either the recycling bin or the trash bin) may be presented as the type of waste receptacle where an example waste item may be deposited at the user's home.

In some embodiments, the rules may either be stored locally at the device or may be stored externally to the device and requested by the device before making a waste receptacle recommendation to the user. In some embodiments, if the device is stationary, then the rules associated with the device may remain consistent because the location of the device may remain consistent. However, if the device is a mobile device, the rules for determining which one or more waste receptacles may be appropriate for a given waste item may change depending on the location of the user and the mobile device. Given this, determination of which waste receptacle is appropriate for the waste item may be made based on the geolocation of the mobile device. The geolocation may refer to the geographical location of the waste receptacles and may be determined through such means as Global Position System (GPS) coordinates, or any other means for determining location of an object. That is, similar to the manner in which it is determined which list of waste items is associated with a location, the particular rules associated with a location may be requested from an external source (such as an external server hosting a database), or may be stored locally at a device.

In some embodiments, the one or more types of waste receptacles in which the waste item may be deposited may also be based on a current state of the waste item. That is, the determination may not only be based on the type of waste item, but also may be based on its state. The state of the waste item may include factors such as how clean or dirty the waste item is. For example, if the waste item is a pizza box, it may include scraps of food and food stains, or it may be completely clean. In the first scenario, the appropriate waste receptacle may be a general trash bin because the dirty box may not be able to be processed by a recycling plant. However, in the second case, the appropriate waste receptacle may be the recycling bin. The state of the waste item may also include a level of deformation or damage to the waste item. For example, a broken glass bottle may only be appropriate for the general trash bin, but a full intact glass bottle may be recycled. These are just a few examples of a state of a waste item, and may include any other number of factors that may be determinative as to whether the waste item can be recycled, composted, etc. The status of the waste item, in some instances, may be determined based on some of the same or similar methods used to determine the type of waste item (for example, computer vision, manual indication by the user, etc.). In some instances, the location-based rules may also be relevant to the status of the item. For example, Municipality A may have a rule that a slightly torn box can be recycled, but Municipality B may have a rule that any damage to a box means it can no longer be recycled.

Block 308 of the method 300 may include presenting an indication of the first waste receptacle to the user. In some embodiments, once the type of waste item is determined, an indication may be presented to the user of one or more types of waste receptacles in which the waste item presented by the user may be deposited. In some instances, the indication may be provided through a display of the device. In some instances, for example, if the device is a stationary device, the one or more waste receptacles may actually be located proximate to the device. In such instances, an indication to the user may be provided through one or more of the waste receptacles themselves. For example, an LED light on the one or more waste receptacles may turn on to indicate that the waste item may be deposited in any of those waste receptacles (this is merely one example of a potential indication that a waste receptacle may provide, and should not be taken to be limiting. For example, the waste receptacles may themselves include one or more displays that may present information indicating to the user that they should either be used or not be used to deposit the waste item). In some cases, the waste receptacles themselves may provide the indication even if the device if a mobile device. For example, the mobile device may be able to determine that one or more waste receptacles are proximate to the mobile device, and the mobile device may provide an indication to the one or more waste receptacles to then provide an indication to the user which of the waste receptacles may be used. In some cases, both a stationary device and a mobile device may be used, and the mobile device may provide an indication to the stationary device to provide an indication to the user which waste receptacle(s) may be used. For example, this may be the case when the mobile device is used to capture the one or more images, video, and/or real-time video feed of the waste item, but the waste receptacles are also proximate to a display screen that may be in communication with the mobile device. The mobile device may send an indication to the display screen proximate to the waste receptacles to provide an indication as to which waste receptacle may be used.

In some embodiments, the indication of the one or more waste receptacles in which the waste item may be deposited may be provided in any number of forms. As a first example, the indication may be in the form of a textual instruction including the name of the type of one or more waste receptacles. As a second example, the indication may be in the form of an image of the types of one or more waste receptacles. As a third example, the indication may be in the form of a logo that is typically associated with the type of waste receptacle (for example, the Mobius loop recycling logo). Additionally, in some scenarios, the one or more waste receptacles may not be located proximate to the device providing the indication to the user. In these scenarios, the device may also indicate to the user one or more locations where they may find the appropriate one or more waste receptacles. For example, the device may provide a name of a location to the user, may provide a map (for example, a layout of a building, a map of a city, or any other type of map) with an indication on the map of where the user can find the waste receptacle, or may provide such an indication in any number of other ways. Furthermore, while various types of indications are described above, any number of these indications may be presented in combination with one another to the user. For example, the word "recycling bin" may be presented along with a picture of a recycling bin.

The operations described and depicted in the illustrative process flow of FIG. 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 3 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative System Architecture

Figure 4:
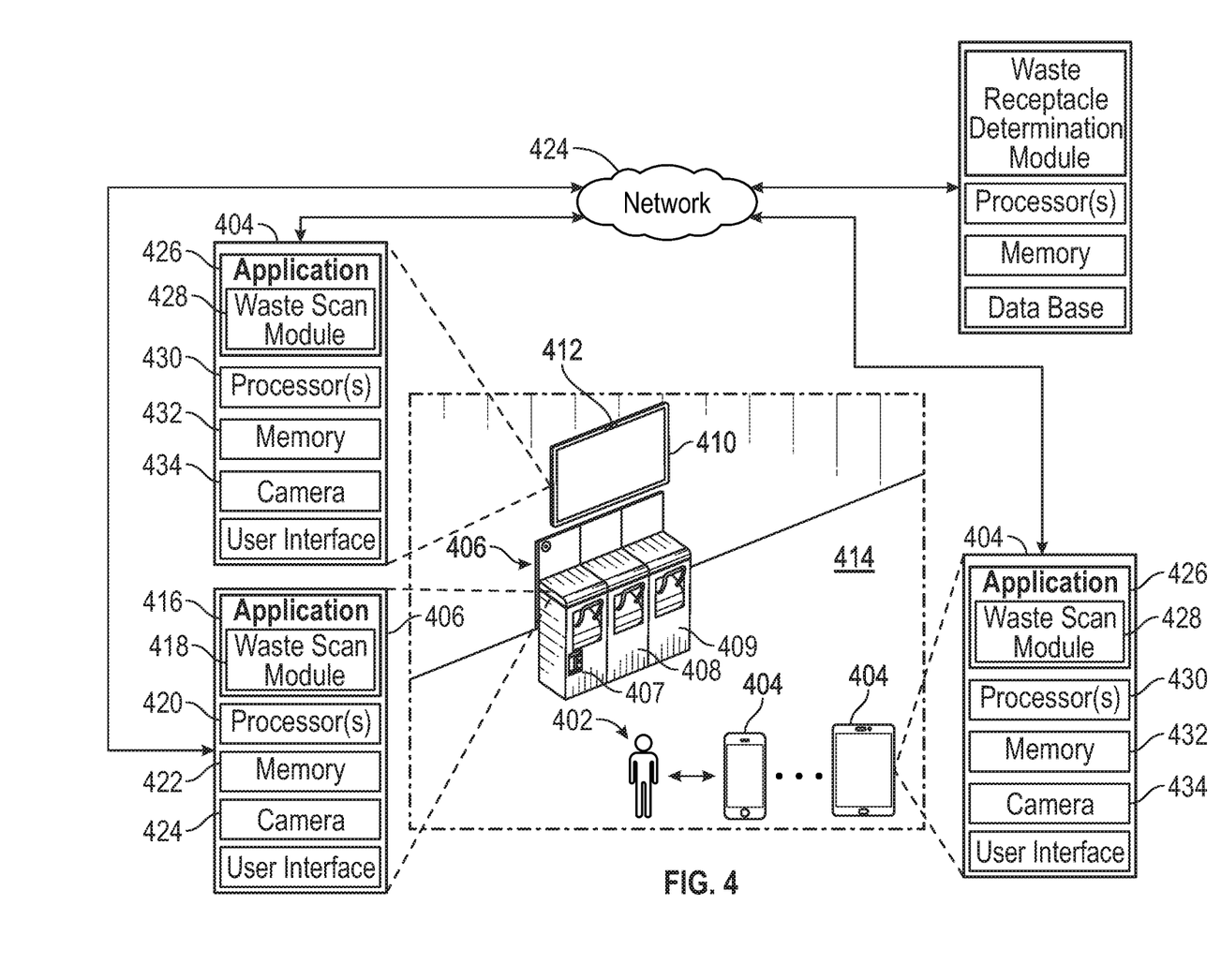
FIG. 4 depicts an example system architecture, in accordance with one or more example embodiments of the disclosure.

FIG. 4 illustrates an example system 400 for waste receptacle determinations, in accordance with one or more example embodiments of the present disclosure.

Referring to FIG. 4, the system 400 may include one or more devices, which may further include one or more mobile devices 404 (which may include, for example, mobile phones, tablets, and/or any other number and/or types of devices) and/or one or more stationary devices 410 (which may include for example, wall-mounted devices, or other types of stationary devices). The one or more mobile devices 404 may be the same as mobile device 104 and/or any other mobile device described herein. Similarly, the one or more stationary devices 410 may be the same as stationary device 204 and/or any other stationary device described herein. At least part of the system 400 may also be found within an environment 414. The environment 414 may be, for example, a physical location, such as a cafeteria or a conference room of a corporate office, to provide one non-limiting example (however, the environment 414 may also include any other physical location). The environment 414 may include also include one or more waste receptacles 406, such as a first waste receptacle 407, a second waste receptacle 408, and/or a third waste receptacle 409 (as well as any other number of waste receptacles). The waste receptacles may include one or more different types of waste receptacles in which the user 402 may deposit a waste item. For example, the first waste receptacle 407 may be a recycling bin, the second waste receptacle 408 may be a compost bin, and the third waste receptacle 409 may be a general trash bin. However, these are merely examples of types of waste receptacles, and other type of waste receptacle, and/or number of waste receptacles, may similar be included within the system 400.

In some embodiments, the one or more mobile devices 404 may be associated with one or more users 402. The one or more mobile devices 404 may include an application 426, which may include at least a waste item scan module 428. The waste item scan module 428 may be used to perform any of the operations described herein, such as receiving one or more images, videos, and/or live video feeds of a waste item of the user 402. The one or more mobile devices 404 may also include at least one or more processor(s) 430, memory 432, one or more sensors 434, and a user interface 435. The one or more sensors 434, for example, may include cameras, LIDAR sensors, accelerometers, gyroscopes, location sensors, or any other type of sensor. The one or more sensors 434 may be used to capture data regarding a waste item. For example, the one or more sensors 434 may be used to capture one or more images, videos, and/or real-time video feeds of a waste item. The user interface 435 may be a user interface within the application 426 of the mobile device 404 and may allow the mobile device 404 to present information to the user 402. The one or more mobile devices 404 may also include any other elements, such as described with respect to the computing element 500 of FIG. 5.

In some embodiments, the one or more stationary devices 410 may not be associated with the one or more users 402, but may rather be stationary in a location within the environment 414. The one or more stationary devices 410 may include similar elements to the one or more mobile devices 404, such as an application 436, which may include at least a waste scan module 437. The one or more stationary devices 410 may also include at least one or more processor(s) 438, memory 439, one or more sensors 440, and a user interface 441. The one or more sensors 440, for example, may include cameras, LIDAR sensors, accelerometers, gyroscopes, location sensors, or any other type of sensor. The one or more sensors 440 may be used to capture data regarding a waste item. For example, the one or more sensors 440 may be used to capture one or more images, videos, and/or real-time video feeds of a waste item. The user interface 441 may be a user interface within the application 436 of the stationary devices 410 and may allow the stationary devices 410 to present information to the user 402. The one or more stationary devices 410 may also include any other elements, such as described with respect to the computing element 500 of FIG. 5.

In some embodiments, the one or more waste receptacles 406 may also include similar elements as the one or more devices, such as an application 416, which may include at least a waste scan module 418. That is, any of the one or more mobile devices 404, one or more stationary devices 410, and/or the one or more waste receptacles 406 may be used to perform some or all of the operations with respect to the waste item identification. For example, any of the one or more mobile devices 404, one or more stationary devices 410, and/or the one or more waste receptacles 406 may be used to capture information about the waste item that may be used to determine the appropriate waste receptacle 406 for the waste item to be deposited in. The one or more waste receptacles 406 may also include at least one or more processor(s) 420, memory 422, one or more sensors 424, and/or a user interface 427. The one or more sensors 424, for example, may include cameras, LIDAR sensors, accelerometers, gyroscopes, location sensors, or any other type of sensor. The one or more sensors 424 may be used to capture data regarding a waste item. For example, the one or more sensors 424 may be used to capture one or more images, videos, and/or real-time video feeds of a waste item. The user interface 427 may be a user interface within the application 416 of the waste receptacles 406 and may allow the waste receptacles 406 to present information to the user 402. The one or more waste receptacles 406 may also include one or more output elements 421. The one or more output elements 421 may provide an indication to the user 402 that the waste receptacle is an appropriate waste receptacle for the waste item. For example, the one or more output elements 421 may include an LED light on a waste receptacle as described herein. The one or more output elements 421, however, may also include any other element that may provide such an indication to a user 402, such as a speaker through which an audio indication may be provided to the use 402. The one or more waste receptacles 406 may also include any other elements, such as described with respect to the computing element 500 of FIG. 5.

In some embodiments, the one or more mobile devices 404, the one or more stationary devices 410, and/or one or more waste receptacles 406 may be in communication with a remote system 442 (for example, a remote cloud system). The remote system 442 may be, for example, a remote server that may be used to perform some or all of the operations described herein. The remote system 442 may include one or more processor(s) 444, memory 445, and/or a database 446. The remote system 442 may also include one or more modules, including at least a waste receptacle determination module 447. The waste receptacle determination module 447 may be used to perform any of the operations described herein, such as determining an appropriate waste receptacle 406 in which a waste item may be deposited based on one or more images, videos, and/or live video feeds of the waste item captured by the one or more mobile devices 404, the one or more stationary devices 410, and/or one or more waste receptacles 406. The database 446 may include any of the previously-captured images, videos, and/or real-time video feeds of waste items. For example, as described herein, these previously-captured images, videos, and/or real-time video feeds of waste items may be used by an artificial intelligence algorithm to determine a type of a waste item being presented by a user to any of the one or more mobile devices 404, one or more stationary devices 410, and or one or more waste receptacles 406. The remote system 442 may also include any other elements, such as described with respect to the computing element 500 of FIG. 5). Additionally, it should be noted that while the waste receptacle determination module 447 is depicted as being located in the remote system 442, the waste receptacle determination module 447 may similarly be included in any other component of the system 400, such as, for example, the one or more mobile devices 404, the one or more stationary devices 410, and or the one or more waste receptacles 406.

In some embodiments, the one or more mobile devices 404, the one or more stationary devices 410, one or more waste receptacles 406, the remote network 442, and any other elements of the system 400 as described herein may be configured to communicate via a communications network 450. The communications network 450 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 450 may have any suitable communication range associated therewith and may include, for example, global networks (e.g., the Internet), metropolitan area networks (MANs), wide area networks (WANs), local area networks (LANs), or personal area networks (PANs). In addition, communications network 416 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Illustrative Computing Element

Figure 5:
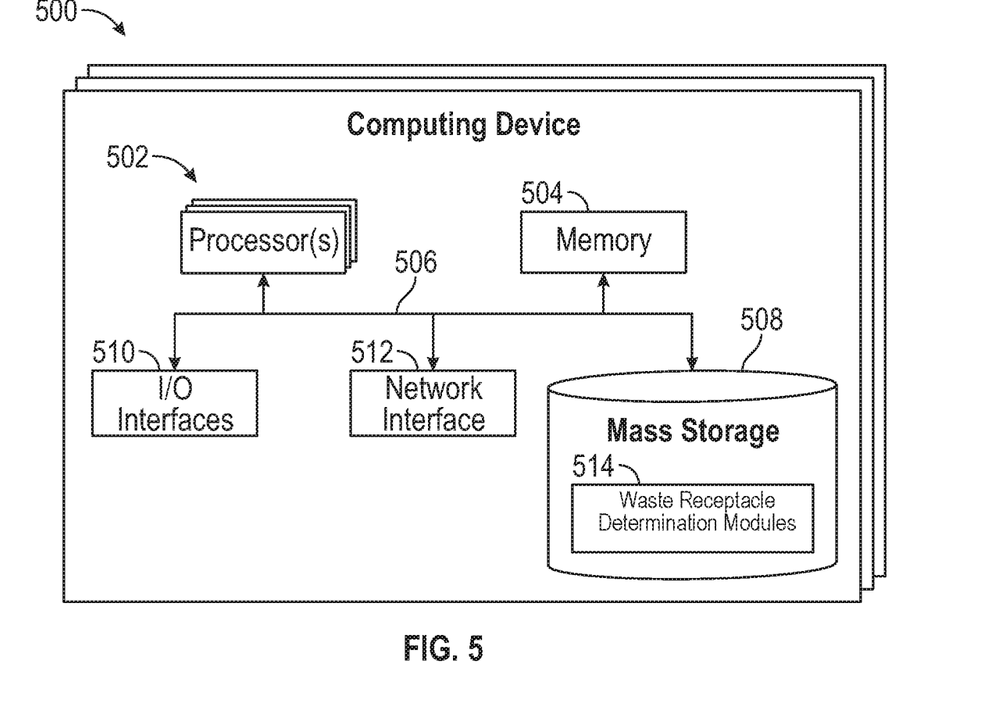
FIG. 5 depicts an example computing element, in accordance with one or more example embodiments of the disclosure.

FIG. 5 illustrates an example computing element 500, in accordance with one or more embodiments of this disclosure. The computing element 500 may be a device used to perform any of the processing with respect to the flare artifact score determination or any other processing described herein. The computing element 500 may include at least one processor 502 that executes instructions that are stored in one or more memory devices (referred to as memory 504). The instructions can be, for instance, instructions for implementing functionality described as being carried out by one or more modules and systems disclosed above or instructions for implementing one or more of the methods disclosed above. The processor(s) 502 can be embodied in, for example, a CPU, multiple CPUs, a GPU, multiple GPUs, a TPU, multiple TPUs, a multi-core processor, a combination thereof, and the like. In some embodiments, the processor(s) 502 can be arranged in a single processing device. In other embodiments, the processor(s) 502 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), a FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 502 can access the memory 504 by means of a communication architecture 506 (e.g., a system bus). The communication architecture 506 may be suitable for the particular arrangement (localized or distributed) and type of the processor(s) 502. In some embodiments, the communication architecture 506 can include one or many bus architectures, such as a memory bus or a memory controller; a peripheral bus; an accelerated graphics port; a processor or local bus; a combination thereof; or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing element or component. Examples of various types of non-transitory storage media can include hard-disc drives, zip drives, CD-ROMs, digital versatile discs (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing element.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory.

In addition to storing executable instructions, the memory 504 also can retain data, such as any ledger 156 information, among other data.

Each computing element 500 also can include mass storage 508 that is accessible by the processor(s) 502 by means of the communication architecture 506. The mass storage 508 can include machine-accessible instructions (e.g., computer-readable instructions and/or computer-executable instructions). In some embodiments, the machine-accessible instructions may be encoded in the mass storage 508 and can be arranged in components that can be built (e.g., linked and compiled) and retained in computer-executable form in the mass storage 508 or in one or more other machine-accessible non-transitory storage media included in the computing element 500. Such components can embody, or can constitute, one or many of the various modules disclosed herein. Such modules are illustrated as waste receptacle determination modules 514.

Execution of the temperature waste receptacle determination modules 514, individually or in combination, by at least one of the processor(s) 502, can cause the computing element 500 to perform any of the operations described herein (for example, the operations described with respect to FIG. 1-4, as well as any other operations).

Each computing element 500 also can include one or more input/output interface devices 510 (referred to as I/O interface 510) that can permit or otherwise facilitate external devices to communicate with the computing element 500. For instance, the I/O interface 510 may be used to receive and send data and/or instructions from and to an external computing element. The computing element 500 also includes one or more network interface devices 512 (referred to as network interface(s) 512) that can permit or otherwise facilitate functionally coupling the computing element 500 with one or more external devices. Functionally coupling the computing element 500 to an external device can include establishing a wireline connection or a wireless connection between the computing element 500 and the external device. The network interface devices 512 can include one or many antennas and a communication processing device that can permit wireless communication between a vehicle and either another vehicle or an external device. The other vehicle can be, for example, one of the vehicles included in the network 110 or an out-of-network vehicle. The external device can be, for example, one of the mobile devices included in the network 110. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like.

In some embodiments, the computing element 500 may be in communication with an imaging device 516 (for example, through the I/O interface 510 of the computing element as shown in FIG. 5). The imaging device 516 may be the same as any of the imaging devices described herein (for example, an imaging device for which a flare artifact score is determined based on one or more images that the imaging device captures).

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing element. As another example, both a software application executing on a computing element and the computing element can embody a module. As yet another example, one or more modules may reside within a process and/or thread of execution. A module may be localized on one computing element or distributed between two or more computing elements. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electromechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing element. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not That which is claimed is:

1. A system comprising:
   at least one processor; and
   at least one memory storing computer-executable instructions, that when executed by the at least one processor, cause the at least one processor to:
   receive, from a sensor of a device, an image of a first waste item of a user;
   determine, based on a comparison of the image to images of waste items input to a machine learning algorithm, a product characteristic of the first waste item, the product characteristic indicative of a tear in the first waste item;
   determine a geolocation of the device;
   select, based on the geolocation of the device, a first rule from two or more rules for a determination of which waste receptacle of a plurality of waste receptacles a waste item is to be deposited, wherein the first rule indicates that a torn waste item is recyclable, and wherein the two or more rules include a second rule for a second geolocation indicating that a torn waste item is not recyclable;
   determine, based on the product characteristic of the first waste item and the first rule, that the first waste item is to be disposed of using a first waste receptacle of the plurality of waste receptacles, wherein the first waste receptacle is a recycling receptacle;
   cause presentation of an indication of the first waste receptacle to the user at the device; and
   re-train the machine learning algorithm using the image.

2. The system of claim 1, wherein determining the product characteristic of the first waste item further comprises to:
   compare image data of the image to image data of the images of the waste items input to the machine learning algorithm;
   determine that the first waste item and the one or more of the images of the waste items input to the machine learning algorithm comprise the product characteristic; and
   determine that the image represents at least a second waste item disposed of using the first waste receptacle.

3. The system of claim 1, wherein the computer-executable instructions further cause the at least one processor to:
   receive, by the sensor of the device, a second image of a second waste item;
   determine, based on a comparison of the second image to the images of the waste items input to the re-trained machine learning algorithm, a product characteristic of the second waste item;
   determine, based on the product characteristic of the second waste item, that the second waste item is to be disposed of using a second waste receptacle; and
   present an indication of the second waste receptacle to the user.

4. The system of claim 1, wherein the computer-executable instructions further cause the at least one processor to:
   receive, from a second sensor of second device, a second image of a second waste item;
   determine, based on a comparison of the second image to the images of the waste items input to the re-trained machine learning algorithm, a second product characteristic of the second waste item;
   determine that the second device is located in a second geolocation;
   determine, based on the second device being located in the second geolocation, one or more rules associated with the second geolocation, wherein the one or more rules associated with the second geolocation are different than the two or more rules;
   determine, based on the second product characteristic of the second waste item and the one or more rules associated with the second geolocation, that the second waste item is to be disposed of using the second waste receptacle; and
   cause presentation of an indication of the second waste receptacle at the second device.

5. The system of claim 1, wherein the computer-executable instructions further cause the at least one processor to:
   determine that the first waste receptacle is located greater than a threshold distance from the device; and
   provide, based on the determination that the first waste receptacle is located greater than a threshold distance from the device, an indication of a location of the first waste receptacle.

6. The system of claim 1, wherein to determine that the first waste item is to be disposed of using the first waste receptacle is further based on a list of available waste receptacles in a location of the device.

7. The system of claim 1, wherein the computer-executable instructions further cause the at least one processor to:
   open, based on the determination that the first waste item is to be disposed of using the first waste receptacle, the first waste receptacle for the first waste item to be deposited in the first waste receptacle.

8. A method comprising:
   receiving, from a sensor of a device, an image of a first waste item of a user;
   determining, based on a comparison of the image to images of waste items input to a machine learning algorithm, a product characteristic of the first waste item, the product characteristic indicative of a tear in the first waste item;
   determining a geolocation of the device;
   selecting, based on the geolocation of the device, a first rule from two or more rules for determination of which waste receptacle of a plurality of waste receptacles a waste item is to be deposited, wherein the first rule indicates that a torn waste item is recyclable, and wherein the two or more rules include a second rule for a second geolocation indicating that a torn waste item is not recyclable;
   determining, based on the product characteristic of the first waste item and the first rule, that the first waste item is to be disposed of using a first type of waste receptacle, wherein the first type of waste receptacle is a recycling receptacle;
   causing presentation of an indication of the first type of waste receptacle at the device; and
   re-training the machine learning algorithm using the image.

9. The method of claim 8, wherein determining the product characteristic of the first waste item further comprises:
   comparing image data of the image to image data of the images of the waste items input to the machine learning algorithm;
   determining that the first waste item and the image of the waste item input to the machine learning algorithm comprise the product characteristic; and determining that the image represents a previous waste item disposed of using the waste receptacle.

10. The method of claim 8, further comprising:
identify, based on the image, image data indicative of a second waste item;
determine, based on a comparison of the image to the images of the waste items input to the machine learning algorithm, a second product characteristic of the second waste item;
determine, based on the second product characteristic of the second waste item, that the second waste item is to be disposed of using a second type of waste receptacle; and
cause presentation of an indication of the second type of waste receptacle to the user.

11. The method of claim 8, further comprising:
receiving, from a second sensor of a second device, a second image of a second waste item;
determining, based on a comparison of the second image to images of waste items input to the re-trained machine learning algorithm, a second product characteristic of the second waste item;
determining that the second device is located in a second geolocation;
determining, based on the second device being located in the second geolocation, one or more rules associated with the second geolocation, wherein the one or more rules associated with the second geolocation are different than the two or more rules;
determining, based on the second product characteristic of the second waste item and the one or more rules associated with the second geolocation, that the second waste item is to be disposed of using a second type of waste receptacle; and
causing presentation of an indication of the second type of waste receptacle at the second device.

12. The method of claim 8, further comprising:
determining that the first type of waste receptacle is located greater than a threshold distance from the device; and
providing, based on the determination that the first type of waste receptacle is located greater than a threshold distance from the device, an indication of a location of the first type of waste receptacle.

13. The method of claim 8, wherein determining that the first waste item is to be disposed of using the first type of waste receptacle is further based on a list of available types of waste receptacles in the geolocation of the device.

14. The method of claim 8, further comprising:
opening, based on the determination that the first waste item is to be disposed of using the first type of waste receptacle, the first type of waste receptacle for the first waste item to be deposited in the first type of waste receptacle, wherein the first type of waste receptacle is otherwise closed and inaccessible.

15. A non-transitory computer-readable medium storing computer-executable instructions which when executed by one or more processors result in performing operations comprising:
receiving, from a sensor of a device, an image of a first waste item of a user;
determining, based on a comparison of the image to images of waste items input to a machine learning algorithm, a product characteristic of the first waste item, the product characteristic indicative of a tear in the first waste item;
determining a geolocation of the device;
selecting, based on the geolocation of the device, a first rule from two or more rules for determination of which waste receptacle of a plurality of waste receptacles a waste item is to be deposited, wherein the first rule indicates that a torn waste item is recyclable, and wherein the two or more rules include a second rule for a second geolocation indicating that a torn waste item is not recyclable;
determining, based on the product characteristic of the first waste item and the first rule, that the first waste item is to be disposed of using a first type of waste receptacle, wherein the first type of waste receptacle is a recycling receptacle; and
causing presentation of an indication of the first type of waste receptacle at the device.

16. The non-transitory computer-readable medium of claim 15, wherein determining the product characteristic of the first waste item further comprises:
comparing image data of the image to image data of the images of the waste items input to the machine learning algorithm;
determine that the first waste item and the one or more of the images of the waste items input to the machine learning algorithm comprise the product characteristic; and
determine that the image represents at least a previous waste item disposed of using the waste receptacle.

* * * * *